United States Patent [19]

Udagawa

[11] Patent Number: 4,776,073
[45] Date of Patent: Oct. 11, 1988

[54] METHOD OF MANUFACTURING A STEEL LAMINATE GASKET

[75] Inventor: Tsunekazu Udagawa, Ichikawa, Japan

[73] Assignee: Ishikawa Gasket Co., Ltd., Tokyo, Japan

[21] Appl. No.: 54,358

[22] Filed: May 26, 1987

[30] Foreign Application Priority Data

May 26, 1986 [JP] Japan .................. 61-120788

[51] Int. Cl.⁴ .............................................. B23P 15/00
[52] U.S. Cl. .......................... 29/156.4 R; 156/260; 156/264; 156/300; 277/235 B
[58] Field of Search ............... 29/156.4 R; 277/235 B; 156/260, 264, 300

[56] References Cited

U.S. PATENT DOCUMENTS

| | | | |
|---|---|---|---|
| 1,840,147 | 1/1932 | Woolson | 277/235 B X |
| 2,034,610 | 3/1936 | Dickson | 277/235 B |
| 4,451,051 | 5/1984 | Nicholson | 277/235 B |

Primary Examiner—Timothy V. Eley
Attorney, Agent, or Firm—Frank J. Jordan; C. Bruce Hamburg; Manabu Kanesaka

[57] ABSTRACT

In a method of manufacturing a steel laminate gasket, a plurality of steel plates is separately prepared so that each plate is provided with a plurality of holes. Then, at least two kinds of surface pressure regulation plates are separately prepared. The thickness of the two kinds of the surface pressure regulation plates is different. The surface pressure regulation plates are mounted on one of the steel plates at predetermined portions and connected thereonto so that the surface pressure regulation plates do not move relative to the steel plate. The steel plate with the surface pressure regulation plates is assembled with at least another steel plate.

8 Claims, 3 Drawing Sheets

4,776,073

METHOD OF MANUFACTURING A STEEL LAMINATE GASKET

BACKGROUND OF THE INVENTION AND RELATED ART STATEMENT

The present invention relates to a method of manufacturing a steel laminate gasket with surface pressure regulation plates for use in an internal combustion engine.

A steel laminate gasket is basically formed of a plurality of steel plates. When the steel laminate gasket is used, the steel laminate gasket is situated between two engine blocks and is tightened by bolts extending through the engine blocks. When the steel laminate gasket formed of a plurality of steel plates is thus used, sealing pressure applied to the steel laminate gasket is not even, i.e. an area adjacent the bolt receives sealing pressure stronger than an area away from the bolt.

In the gasket, areas adjacent water and oil holes as well as cylinder bore require high sealing pressure to seal properly therearound. In order to provide high sealing pressure at required areas, surface pressure regulation plates may be attached to the gasket.

As shown in chain lines in FIGS. 1 and 2, the surface pressure regulation plates are small plates having configurations similar to areas to be placed. When a surface pressure regulation plate 10 is situated around a water hole Hw, for example, the surface pressure regulation plate 10 may be a ring shape with an opening corresponding to the water hole Hw.

When a steel laminate gasket with the surface pressure regulation plates is manufactured, required steel plates and surface pressure regulation plates are formed. The surface pressure regulation plates are simply situated at desired areas on one of the steel plates. Thereafter, the steel plate with the surface pressure regulation plates is assembled with other steel plates. The steel plates are finally connected together.

If, for example, a surface pressure regulation plate 11 situated around a cylinder bore Hc is thicker than a surface pressure regulation plate 10 situated around the water hole Hw and other surface pressure regulation plates, the surface pressure regulation plates 11 are situated on a plate 13, while the surface pressure regulation plate 10 and other surface pressure regulation plates are situated on a plate 14. Then, the plates 12, 13, 14 are assembled together. This is because if surface pressure regulation plates with different thickness are situated on one steel plate, after the plates are assembled together, thin surface pressure regulation plates may move between the steel plates.

When surface pressure regulation plates of different kinds are installed in the steel laminate gasket, the conventional method of manufacturing the steel laminate gasket requires complicated steps. Nevertheless, the surface pressure regulation plates may slightly move on the steel plate. Further, in case the surface pressure regulation plates are small, it is inconvenient in the conventional method to handle these surface pressure regulation plates.

Accordingly, one object of the present invention is to provide a method of manufacturing a steel laminate gasket with surface pressure regulation plates, wherein surface pressure regulation plates of any kinds can be immovably installed between steel plates.

Another object of the invention is to provide a method of manufacturing a steel laminate gasket as stated above, wherein the steel laminate gasket with the surface pressure regulation plates can be easily and economically manufactured.

Further objects and advantages of the invention will be apparent from the following description of the invention.

SUMMARY OF THE INVENTION

In accordance with a method of manufacturing a steel laminate gasket of the present invention, at first a plurality of steel plates is prepared separately so that each steel plate is provided with a plurality of small holes. Also, at least two kinds of surface pressure regulation plates are separately prepared. The thickness of the surface pressure regulation plates of one kind is different from that of the surface pressure regulation plates of other kinds. The surface pressure regulation plates are mounted on one of the steel plates at predetermined portions and connected thereto so that the surface pressure regulation plates do not move relative to the steel plate. Finally, the steel plate with the surface pressure regulation plates thereon is assembled with other steel plates.

The surface pressure regulation plates of one kind are provided with at least one opening therein respectively. The diameter of the opening is the same as that of the holes. Preferably, the surface pressure regulation plates of different kinds are installed around the respective holes. The surface pressure regulation plates are connected to the steel plates by spot welding or glue.

DETAILED DESCRIPTION OF PREFERRED EMBODIMENTS

Figure 1:
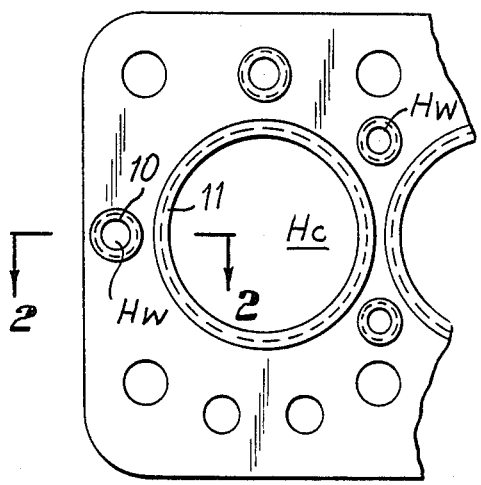
FIG. 1 is a partial plan view of a conventional steel laminate gasket with surface pressure regulation plates.
Figure 2:
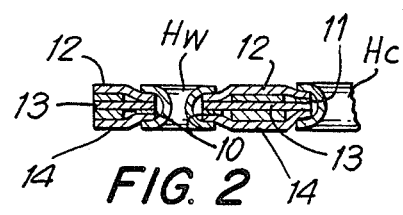
FIG. 2 is a section view taken along lines 2—2 in FIG. 1.
Figure 3:
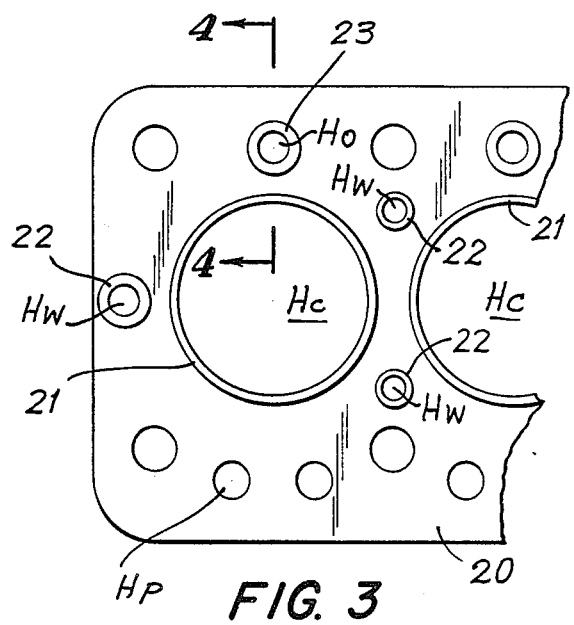
FIG. 3 is a partial plan view of a steel plate with surface pressure regulation plates prepared by a method of the present invention.
Figure 4:
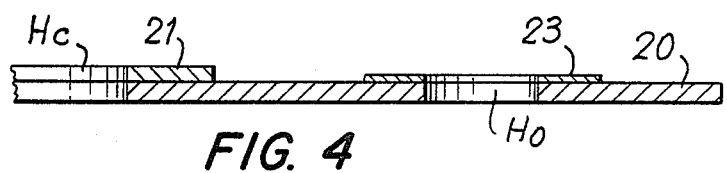
FIG. 4 is an enlarged section view taken along lines 4—4 in FIG. 3.

Referring to FIGS. 3 and 4, a steel plate 20 with surface pressure regulation plates 21, 22, 23 prepared in accordance with the present invention is shown. The surface pressure regulation plates 21 are situated around cylinder bores Hc, the surface pressure regulation plates 22 are situated around water holes Hw, and the surface pressure regulation plates 23 are situated around oil holes Ho. The surface pressure regulation plates may be situated around push rod holes Hp.

The pressure applied around the cylinder bores Hc is higher than the pressure applied around the water holes Hw and the oil holes Ho. Therefore, the surface pressure regulation plate 21 is made thickner than the surface pressure regulation plates 22, 23.

The surface pressure regulation plate 21 may be made of a metal plate, such as a mild steel plate or a stainless steel plate. The surface pressure regulation plates 22, 23 may be made of metal plates as in the pressure regulation plate 21. However, the plates 22, 23. may be made of thin plastic plates with heat resistant property. The thickness, hardness and kind of material of the surface pressure regulation plates are determined by characteristics of an engine that the gasket is installed.

Figure 5:
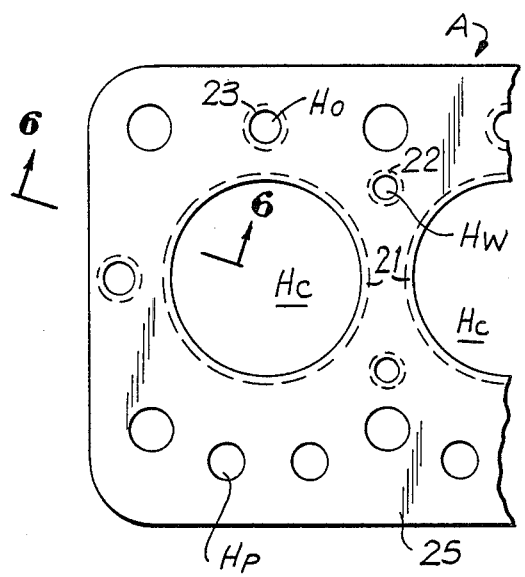
FIG. 5 is a partial plan view of a steel laminate gasket prepared in accordance with the present invention.
Figure 6:
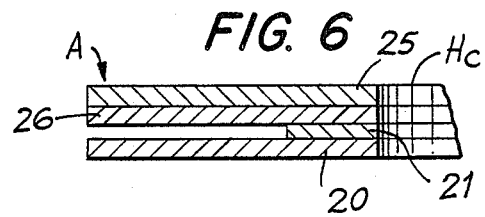
FIG. 6 is an enlarged section view taken along lines 6—6 in FIG. 5.

When a steel laminate gasket A as shown in FIGS. 5 and 6 is manufactured, materials to be used as steel plates and surface pressure regulation plates are selected in view of characteristics of an engine. Characteristics, i.e. quality, thickness and hardness, of an upper plate 25, middle plate 26 and lower plate (steel plate) 20 are different. Similarly, characteristics of the surface pressure regulation plates 21, 22, 23 are different.

Base plates (not shown) made of desired materials are respectively pressed or cut to form the upper, middle and lower plates 25, 26, 20 separately, wherein cylinder bores Hc and other holes are formed. Also, base plates (not shown) are pressed or cut to form the surface pressure regulation plates 21, 22, 23. The surface pressure regulation plates are in doughnut shape and include openings corresponding to the bores or holes of an engine respectively. The outer configuration of the surface pressure regulation plates may be changed as desired.

After the steel plates and surface pressure regulation plates are formed, the surface pressure regulation plates 21, 22, 23 are mounted on the lower plate 20 and connected thereto by spot welding. The surface pressure regulation plates may be attached onto the lower plate 20 by means of a heat resistant glue. As a result, the surface pressure regulation plates 21, 22, 23 are immovably attached onto the lower plate 20.

Finally, the middle and upper plates 26, 25 are situated on the lower plate 20 and connected together. The plates 25, 26, 20 may be connected by spot welding. However, if a flange portion extending from a lower plate and situated above an upper plate is formed around a cylinder bore, since the flange portion holds the entire plates, it is unnecessary to connect the plates by spot welding. If grommets are situated around the cylinder bores, the plates need not be connected together by spot welding as well.

Figure 7:
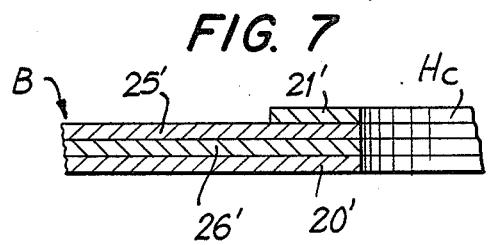
FIG. 7 is a section view similar to FIG. 6 for showing another embodiment prepared in accordance with the present invention.

In a steel laminate gasket B as shown in FIG. 7, surface pressure regulation plates are connected to an upper plate 25' and assembled together with a middle plate 26' and lower a plate 20'. Since the surface pressure regulation plates are securely attached to the upper plate 25', the gasket B can be installed in an engine without any trouble.

Figure 8:
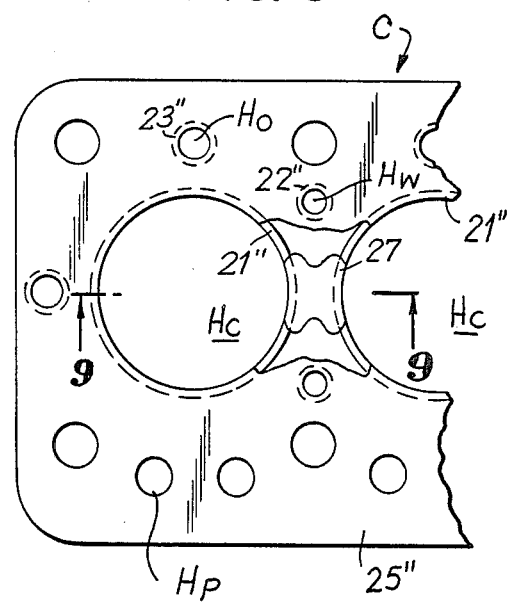
FIG. 8 is a partial plan view of a different embodiment of a steel laminate gasket prepared in accordance with the present invention.
Figure 9:
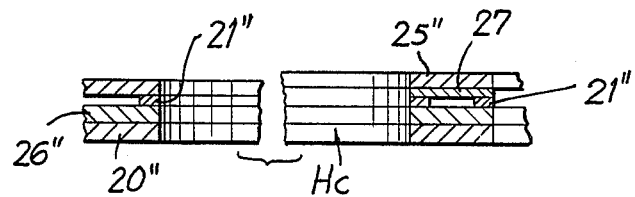
FIG. 9 is an enlarged section view taken along lines 9—9 in FIG. 8.

FIGS. 8 and 9 show a steel laminate gasket C prepared in accordance with the present invention. The gasket C comprises an upper plate 25", a middle plate 26" with surface pressure regulation plates 21" and 27, and a lower plate 20". When manufacturing the gasket C, the surface pressure regulation plates 21" are immovably placed onto the middle plate 26", and then the surface pressure regulation plates 27" are immovably situated on the surface pressure regulation plates 21". The middle plate 26" is finally assembled with the upper and lower plates 25", 20".

In the gasket C, the surface pressure regulation plates 21" are installed to provide sealing pressure around the cylinder bores Hc. However, in case the rigidity of the cylinder head is low, the cylinder head may slightly bend along the longitudinal direction of the engine. If the cylinder head bends slightly, the sealing pressure between the cylinder bores decreases, wherein the surface pressure regulation plate 21" alone can not provide sufficient sealing pressure. The surface pressure regulation plate 27 is installed to compensate the pressure decrease.

In the present invention, the surface pressure regulation plates can be securely and precisely installed on a steel plate. Further, the steel plates can be easily assembled together without causing slipping of the surface pressure regulation plates. In accordance with the present invention, it is possible to provide a precise steel laminate gasket with good quality.

While the invention has been explained with reference to the specific embodiments of the invention, the explanation is illlustrative and the invention is limited only by the appended claims.

What is claimed is:

1. A method of manufacturing a steel laminate gasket comprising,
   preparing a plurality of steel plates separately, each steel plate having a plurality of holes,
   preparing at least two kinds of surface pressure regulation plates separately, thickness of the two kinds of the surface pressure regulation plates being different,
   mounting the surface pressure regulation plates on predetermined portions of one of the steel plates,
   connecting the respective surface pressure regulation plates onto the steel plate so that the surface pressure regulation plates do not move relative to the steel plate, and
   assembling the steel plate with the surface pressure regulation plates thereon with at least another steel plate.

2. A method of manufacturing a steel laminate gasket according to claim 1, wherein the surface pressure regulation plates of one kind are provided with at least one opening therein respectively, diameter of the opening being the same as diameter of one of the holes.

3. A method of manufacturing a steel laminate gasket according to claim 2, wherein the surface pressure regulation plates of different kinds are installed around the respective holes.

4. A method of manufacturing a steel laminate gasket according to claim 3, wherein quality of the respective kinds of the surface pressure regulation plates is different from each other.

5. A method of manufacturing a steel laminate gasket according to claim 4, wherein said surface pressure regulation plates are connected to the steel plate by spot welding.

6. A method of manufacturing a steel laminate gasket according to claim 4, wherein said surface pressure regulation plates are connected to the steel plate by glue.

7. A method of manufacturing a steel laminate gasket according to claim 4, wherein said steel plates are assembled so that the surface pressure regulation plates are situated between the two steel plates.

8. A method of manufacturing a steel laminate gasket according to claim 4, wherein the surface pressure regulation plate of one kind is partially overlapped with surface pressure regulation plate of another kind.

* * * * *